(12) United States Patent
Lim

(10) Patent No.: US 7,218,260 B2
(45) Date of Patent: May 15, 2007

(54) COLUMN ANALOG-TO-DIGITAL CONVERTER OF A CMOS IMAGE SENSOR FOR PREVENTING A SUN BLACK EFFECT

(75) Inventor: Su-Hun Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/328,591

(22) Filed: Jan. 10, 2006

(65) Prior Publication Data

US 2006/0170803 A1    Aug. 3, 2006

(30) Foreign Application Priority Data

Jan. 28, 2005   (KR) .................... 10-2005-0007983

(51) Int. Cl.
*H03M 1/00* (2006.01)
(52) U.S. Cl. .................. 341/122; 341/118; 341/120; 341/155
(58) Field of Classification Search ............. 341/155, 341/118, 120, 122, 165
See application file for complete search history.

(56) References Cited

U.S. PATENT DOCUMENTS

| | | | | |
|---|---|---|---|---|
| 5,369,309 A | * | 11/1994 | Bacrania et al. ............ | 327/94 |
| 5,877,715 A | * | 3/1999 | Gowda et al. .............. | 341/122 |
| 5,880,691 A | * | 3/1999 | Fossum et al. ............. | 341/162 |
| 5,920,274 A | * | 7/1999 | Gowda et al. .............. | 341/155 |
| 6,459,426 B1 | * | 10/2002 | Eglit et al. ................. | 345/213 |
| 6,498,576 B1 | * | 12/2002 | Tian et al. .................. | 341/155 |
| 6,518,910 B2 | * | 2/2003 | Sakuragi et al. ........... | 341/162 |
| 6,660,989 B2 | * | 12/2003 | Guo et al. ................. | 250/208.1 |
| 6,937,279 B1 | * | 8/2005 | Kim et al. .................. | 348/308 |

FOREIGN PATENT DOCUMENTS

| | | |
|---|---|---|
| EP | 1 343 310 A2 | 9/2003 |
| JP | 05-308519 | 11/1993 |
| JP | 09-270961 | 10/1997 |
| JP | 2003-234962 | 8/2003 |
| KR | 1999-0075194 | 10/1999 |
| KR | 2002-0046957 | 6/2002 |
| WO | WO 02/054759 A2 | 7/2002 |

\* cited by examiner

*Primary Examiner*—Linh Nguyen
(74) *Attorney, Agent, or Firm*—F. Chau & Associates, LLC

(57) ABSTRACT

A column analog-to-digital (ADC) circuit for preventing a sun black effect in a CMOS image sensor (CIS) is provided. The ADC circuit includes: a comparator having a signal voltage input port and a reference voltage input port, comparing a reset voltage output from one of a plurality of CIS pixels with a reference voltage in a reset sampling period, and outputting an overflow sensing signal when the reset voltage is lower than the reference voltage; and a digital converter converting the output of the comparator into digital data, wherein the digital converter comprises a first latch storing the overflow sensing signal and outputting a flag signal indicating an overflow in response to the overflow sensing signal in a signal sampling period, when the overflow sensing signal is output from the comparator in a first portion of the reset sampling period.

16 Claims, 5 Drawing Sheets

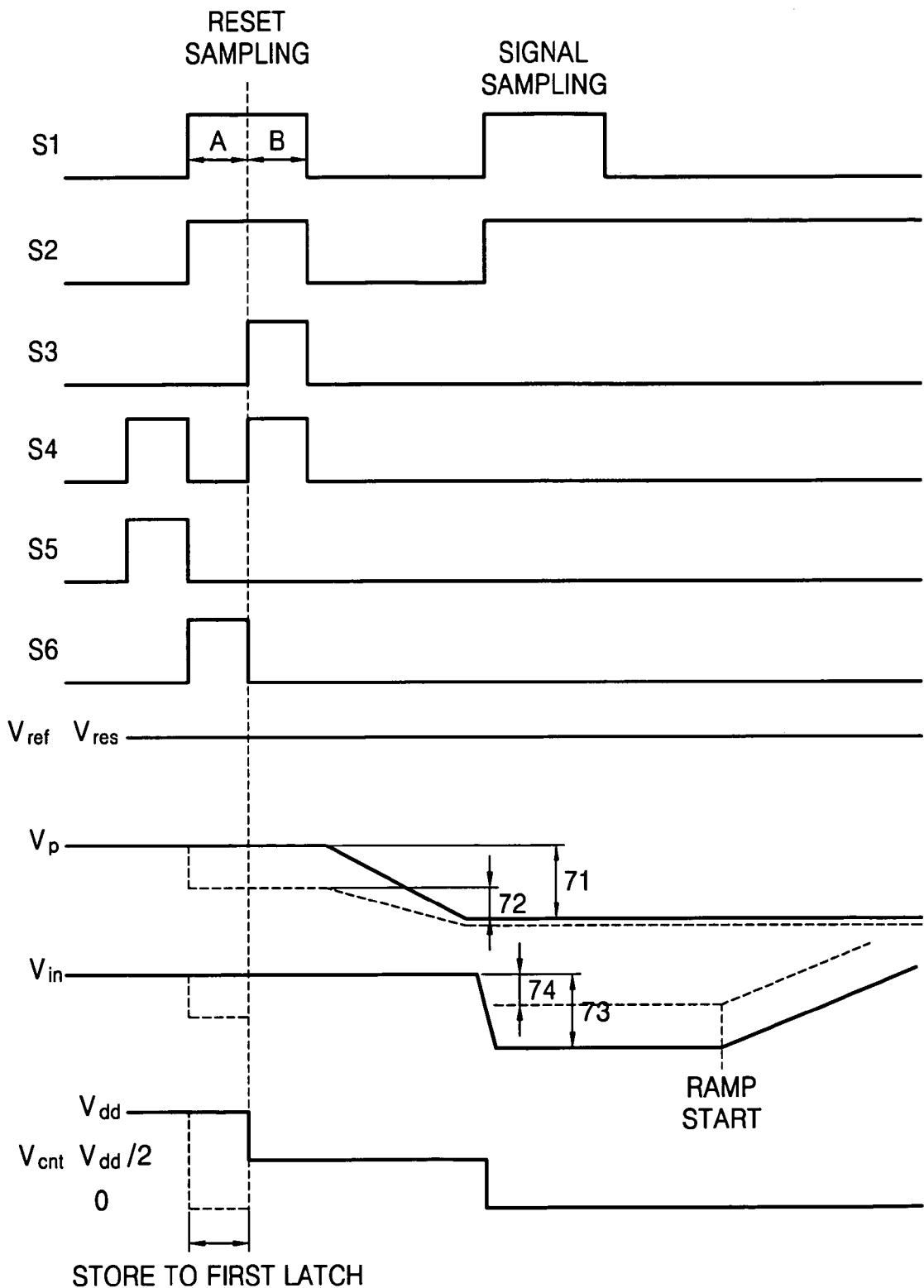

COLUMN ANALOG-TO-DIGITAL CONVERTER OF A CMOS IMAGE SENSOR FOR PREVENTING A SUN BLACK EFFECT

CROSS-REFERENCE TO RELATED PATENT APPLICATION

This application claims priority to Korean Patent Application No. 10-2005-0007983, filed on Jan. 28, 2005, in the Korean Intellectual Property Office, the disclosure of which is incorporated by reference herein in its entirety.

BACKGROUND OF THE INVENTION

1. Technical Field

The present invention relates to a CMOS image sensor (CIS), and more particularly, to an analog-to-digital converter (ADC) for converting analog signals output from pixels of a CIS into digital data by using a double sampling technique.

2. Discussion of the Related Art

A CIS has found increasing use in battery-dependent portable applications such as digital cameras, video cell phones and hand-held scanners because it operates at a low voltage and consumes less power than a charge-coupled device (CCD).

However, when images are produced using the CIS, a sun black effect may occur. The sun black effect is a phenomenon similar to a sunspot in which a portion of an image to be displayed brightly is displayed darkly due to an overflow of a charge inside a pixel when a high illumination person or object such as the sun is photographed.

In particular, the sun block effect occurs when the intensity of radiation under high illumination exceeds a dynamic range of a pixel. In other words, the sun black effect occurs when a difference between a reset level and a signal level of an active pixel sensor (APS) in the CIS is decreased because the reset level is below a normal level.

FIG. 1 shows a conventional column ADC circuit for use with a CIS circuit.

As shown in FIG. 1, the column ADC circuit converts an analog voltage corresponding to a photo charge output from an APS in the CIS circuit into digital data by double sampling.

The double sampling is composed of a reset sampling for sampling a reset voltage of the APS and a signal sampling for sampling a signal voltage of the APS. A voltage difference generated by the double sampling is then converted into digital data.

The column ADC circuit of FIG. 1 includes a first switch SW1 controlled by a first control signal S1 located between an output port of the APS and a first node 17, a second switch SW2 controlled by a second control signal S2 located between an output port of a ramp generator of the CIS and a second capacitor $C_1$, a first capacitor $C_0$ connected between the first node 17 and a first input port 19 of a comparator 11, and the second capacitor $C_1$, connected between the first node 17 and the second switch SW2.

The column ADC circuit also includes the comparator 11 having the first input port 19 for receiving a voltage output from the APS and a second input port for receiving a reference voltage $V_{ref}$ and comparing a light signal voltage input from the first input port 19 with the reference voltage $V_{ref}$, and outputting the result of the comparison, an inverter 13 for inversely amplifying signals output from the comparator 11, and a digital converter 15 for converting an analog signal output from the inverter 13 into digital data.

The column ADC circuit further includes a third switch SW3 connected between the first input port 19 and an output port of the comparator 11 and controlled by a third control signal S3, a fourth switch SW4 connected in parallel to the inverter 13 and controlled by a fourth control signal S4.

The digital converter 15 includes a plurality of latches connected in series for counting a clock to correspond to a signal level detected during a normal operation and converting the signal level into digital data on a basis of the counted value.

FIG. 2 shows waveforms for driving the column ADC circuit shown in FIG. 1 and a voltage level at internal nodes of the column ADC circuit in FIG. 1.

Referring now to FIGS. 1 and 2, when the column ADC circuit operates, the control signals S1, S2, S3 and S4 become logic-high in a reset sampling period and their corresponding switches SW1, SW2, SW3 and SW4 are turned-on.

Then, the comparator 11 and inverter 13 have a feedback structure. A reset voltage output from the APS is stored in the first capacitor $C_0$ and a ramp voltage output from the ramp generator is stored in the second capacitor $C_1$. Therefore, a voltage $V_p$ of the first node 17 becomes the level of the reset voltage output from the APS.

A signal voltage corresponding to a photo charge output from the APS is then transmitted to the first node 17 in a signal sampling period. As shown in FIG. 2, a voltage difference 21 is generated between the reset voltage output from the first node 17 and the signal voltage because the signal voltage is lowered to correspond to the photo charge. Similarly, a voltage difference 23 between a reset voltage output from the second node 19 and the signal voltage corresponds to the voltage difference 21 at the first node 17.

As shown in FIG. 2, the voltage $V_p$ of the first node 17 and the voltage $V_{in}$ of the second node 19 operate as shown by the solid lines when under normal illumination, thus illustrating a voltage difference that is proportional to an incident intensity of radiation. As further shown in FIG. 2, the voltages $V_p$ and $V_{in}$ operate as shown by the dotted lines when under high illumination, thus illustrating a voltage difference that is smaller than an actual incident intensity of radiation.

In other words, when the voltages $V_p$ and $V_{in}$ are the dotted lines as shown in FIG. 2, the reset voltage output due to an overflow of the APS during the reset sampling is lower than a normal reset voltage. Therefore, a sun black effect occurs because voltage differences 22 and 24 between the signal voltage during the signal sampling and the reset voltage are below the normal level.

FIG. 3 shows another conventional column ADC circuit for use with a CIS circuit.

The column ADC circuit of FIG. 3 includes the same or similar components as the column ADC circuit in FIG. 1, except for a diode 31. Accordingly, a description of the duplicative components is omitted.

As shown in FIG. 3, a reset voltage may be maintained by adding the diode 31 to an output port of an APS even if an overflow is generated in the APS, thus preventing a sun black effect.

However, in the column ADC circuit of FIG. 3, a double sampling should not be performed since a fixed pattern noise (FPN) may be generated when an input voltage $V_{clamp}$ of the diode 31 is low. In addition, a sun black effect may be generated when the input voltage $V_{clamp}$ is high. Further, an image sensing error may result due to variations in the input voltage $V_{clamp}$.

As such a need exists for a column ADC circuit for use with a CIS that is capable of double sampling while preventing a reset voltage from dropping upon generating an overflow in an APS of the CIS.

SUMMARY OF THE INVENTION

The present invention provides a column ADC circuit and a double sampling method capable of preventing a sun black effect when an overflow is generated in an APS in a CIS under high illumination.

According to an aspect of the present invention, there is provided a column ADC circuit in a CIS, the column ADC circuit comprising: a comparator having a signal voltage input port and a reference voltage input port, comparing a reset voltage output from one of a plurality of CIS pixels with a reference voltage in a reset sampling period, and outputting an overflow sensing signal when the reset voltage is lower than the reference voltage; and a digital converter converting the output of the comparator into digital data, wherein the digital converter comprises a first latch storing the overflow sensing signal and outputting a flag signal indicating an overflow in response to the overflow sensing signal in a signal sampling period, when the overflow sensing signal is output from the comparator in a first portion of the reset sampling period.

The flag signal may indicate that a light signal detected from one of the CIS pixels is a white color.

The column ADC circuit may further comprise a first capacitor connected between a first node and the signal voltage input port of the comparator to store a photo charge output from one of the CIS pixels; a second capacitor connected between a second node and the first node to store a ramp charge output from a ramp generator; a first switch connected between the first node and a photo charge input port receiving the photo charge signal output from the CIS pixel and turned on in the reset sampling period and the signal sampling period; and a second switch connected between the second node and a ramp charge input port receiving the ramp charge signal output from the ramp generator and turned on in the reset sampling period and the signal sampling period.

The digital converter may comprise a plurality of second latches to count a clock to correspond to the photo charge in the signal sampling period and convert the counted clock into the digital data.

The flag signal indicates that a light signal detected from one of the CIS pixels is a white color when a black color is detected in one of the plurality of second latches.

The column ADC circuit may further comprise a third switch connected in parallel with the first capacitor; and a fourth switch connected in parallel with the comparator, wherein the third switch is turned on for a predetermined time before the reset sampling period and connects the first node to the signal voltage input port of the comparator, and the fourth switch is turned on in a second portion of the reset sampling period to equalize a voltage level of the signal voltage input port of the comparator to a level of the reference voltage.

The column ADC circuit may further comprise an inverter inversely amplifying the output of the comparator; and a fifth switch connected in parallel with the inverter, wherein the fifth switch is turned on for the predetermined time before the reset sampling period and in the second portion of the reset sampling period and maintains a clamp voltage of the inverter.

The column ADC circuit may further comprise a capacitor connected between the comparator and the inverter.

The digital converter may output digital data corresponding to the photo charge when the comparator does not output the overflow sensing signal and the comparator outputs the flag signal indicating a white color when the comparator outputs the overflow sensing signal.

The plurality of CIS pixels may be included in an APS of the CIS.

According to another aspect of the present invention, there is provided a double sampling method for converting an analog signal output from a pixel of a CIS into a digital signal, the method comprising: performing a reset sampling by comparing a reset voltage output from the CIS pixel with a reference voltage and generating and storing an overflow sensing signal when the reset voltage is lower than the reference voltage; performing a signal sampling for sampling a signal corresponding to a photo charge output from the CIS pixel; and performing a digital conversion by outputting a flag signal indicating a white color when the overflow sensing signal is stored and outputting digital data corresponding to the photo charge when the overflow sensing signal is not stored.

The digital conversion may comprise counting the time for a voltage corresponding to the photo charge to reach a predetermined voltage and converting the counted value into the digital data, when the overflow sensing signal is not stored.

The double sampling method may further comprise resetting an electric charge of a capacitor storing the photo charge before performing the reset sampling.

The overflow sensing signal is output during a first portion of the reset sampling.

The reset sampling comprises comparing the reset voltage with the reference voltage and storing the overflow sensing signal; and setting a level of the reset voltage to be equal to the reference voltage.

The level of the reset voltage is set during a second portion of the reset sampling.

BRIEF DESCRIPTION OF THE DRAWINGS

The above and other features of the present invention will become more apparent by describing in detail exemplary embodiments thereof with reference to the attached drawings in which:

FIG. 5 is a diagram illustrating waveforms for driving the column ADC circuit shown in FIG. 4 and a voltage level at internal nodes of the column ADC circuit in FIG. 4.

DETAILED DESCRIPTION OF EXEMPLARY EMBODIMENTS

Figure 1:
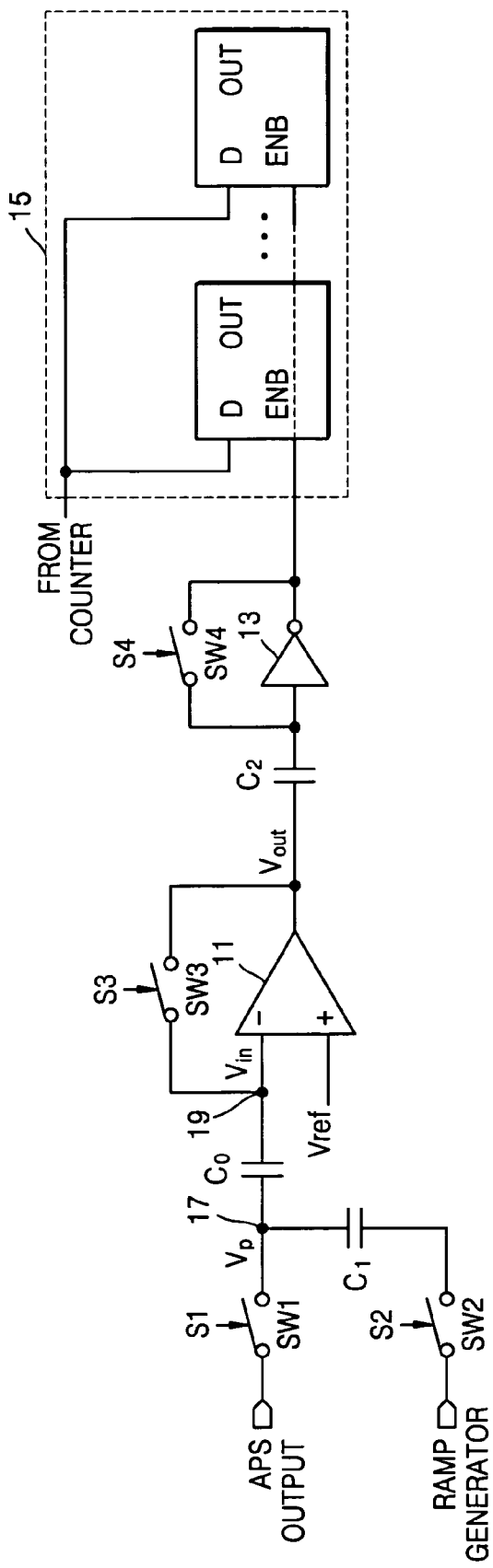
FIG. 1 is a diagram illustrating a conventional column ADC circuit for use with a CIS circuit.
Figure 2:
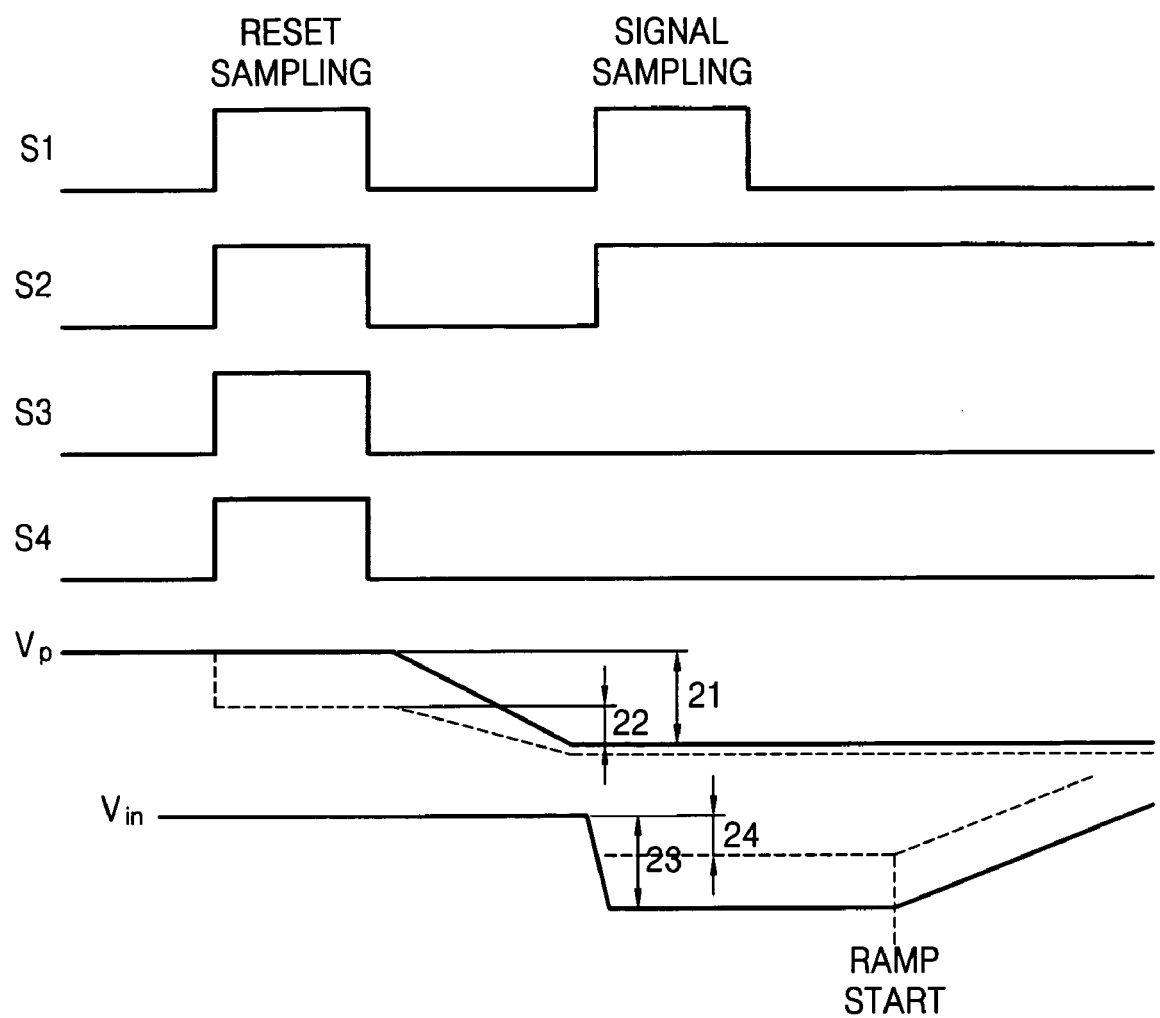
FIG. 2 is a diagram illustrating waveforms for driving the column ADC circuit shown in FIG. 1 and a voltage level at internal nodes of the column ADC circuit in FIG. 1.
Figure 3:
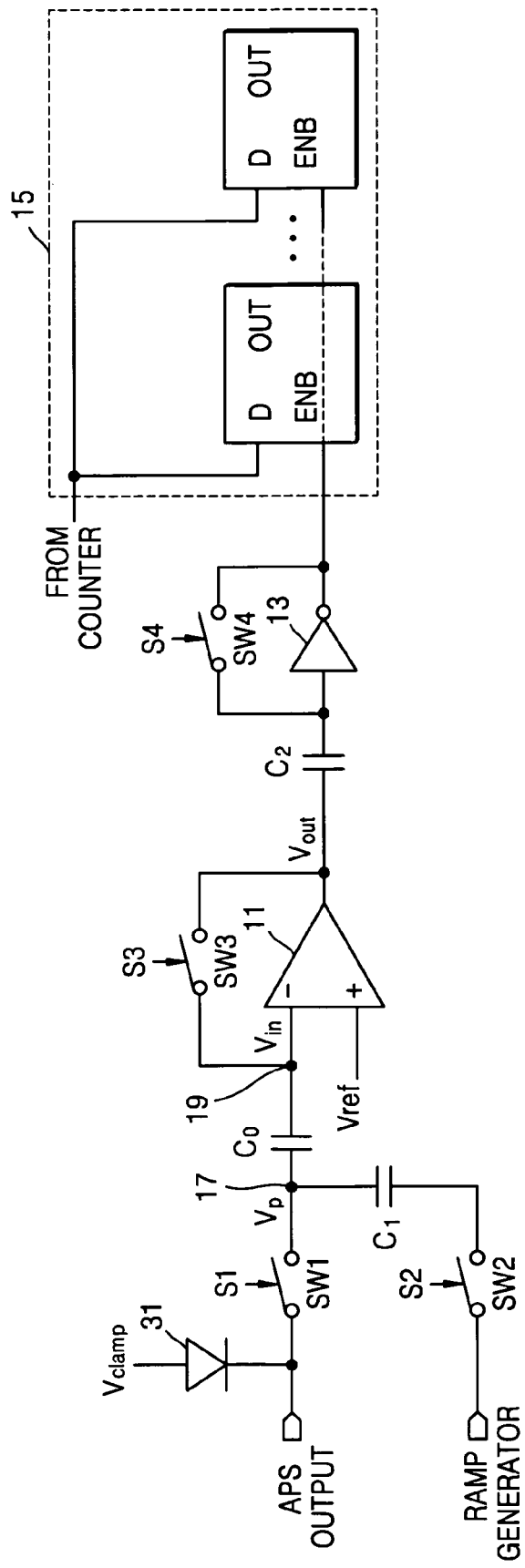
FIG. 3 is a diagram illustrating another conventional column ADC circuit for use with a CIS circuit.

The present invention will now be described more fully with reference to the accompanying drawings, in which exemplary embodiments of the present invention are shown. Like reference numerals in the drawings denote like elements.

Figure 4:
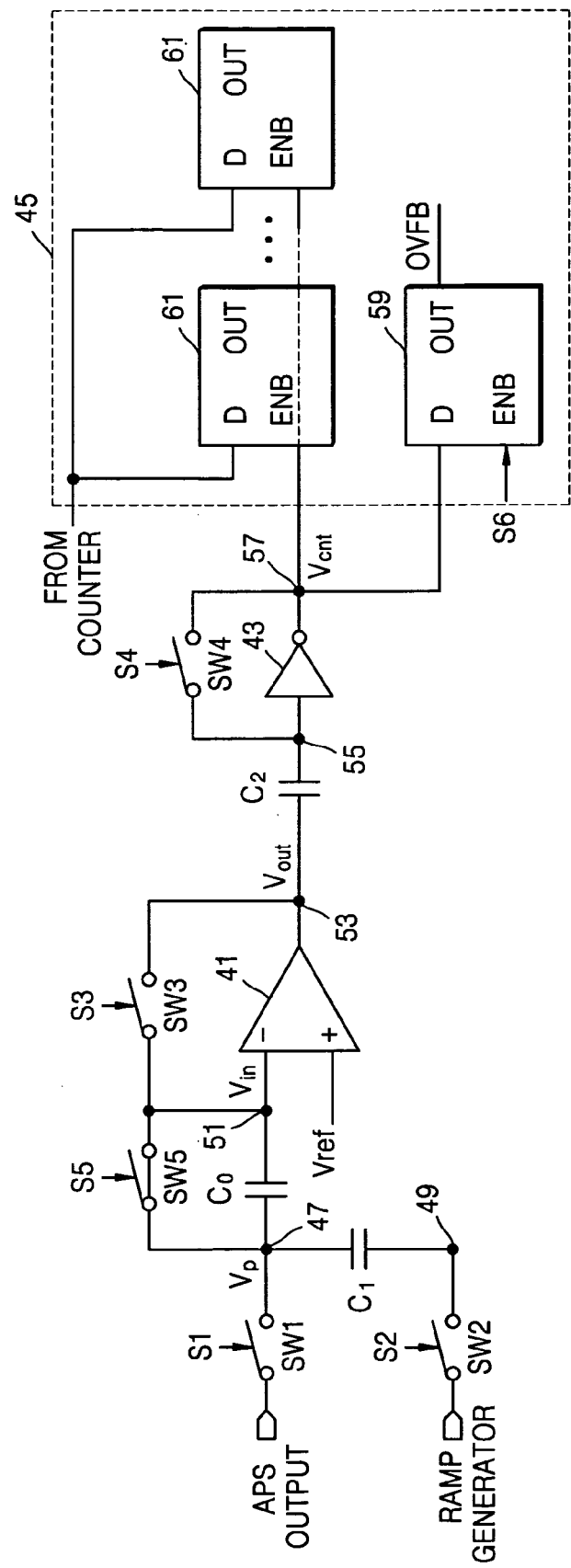
FIG. 4 is a diagram illustrating a column ADC circuit for use with a CIS circuit according to an exemplary embodiment of the present invention.

FIG. 4 shows a column ADC circuit for use with a CIS circuit according to an embodiment of the present invention.

As shown in FIG. 4, the column ADC circuit includes a first switch SW1 controlled by a first control signal S1 located between an output port of an APS of the CIS circuit and a first node 47, a second switch SW2 controlled by a second control signal S2 located between an output port of a ramp generator of the CIS and a second node 49, a first capacitor $C_0$ connected between the first node 47 and a first input port 51 of a comparator 41, and a second capacitor $C_1$, connected between the first node 47 and the second node 49.

The column ADC circuit also includes the comparator 41 having the first input port 51 for receiving a voltage output from the APS and a second input port for receiving a reference voltage $V_{ref}$ and comparing a light signal voltage input from the first input port 51 with the reference voltage $V_{ref}$, and outputting the result of the comparison, an inverter 43 for inversely amplifying signals output from the comparator 41, and a digital converter 45 for converting an analog signal output from the inverter 43 into digital data.

The column ADC circuit further includes a third switch SW3 connected between the first input port 51 and an output port 53 of the comparator 41 and controlled by a third control signal S3, a fourth switch SW4 connected in parallel to the inverter 43 and controlled by a fourth control signal S4, a fifth switch SW5 connected in parallel with the first capacitor $C_0$ and controlled by a fifth control signal S5, and a third capacitor C2 connected between the comparator 41 and the inverter 43.

The digital converter 45 includes a first latch 59 for storing an overflow sensing signal when an overflow is generated in the APS and outputting a flag signal OVFB indicating the generation of the overflow in a signal sampling period. Further, the digital converter 45 includes a plurality of second latches 61 connected in series for counting a clock to correspond to a signal level detected during normal operation and converting the signal level into digital data on a basis of the counted value.

In other words, in the column ADC circuit of FIG. 4, when the overflow is generated in the APS during reset sampling, an overflow is detected in the comparator 41 and the result of the detection is stored in the first latch 59. The first latch 59 then outputs the flag signal OVFB indicating the detection of the overflow instead of a general operation state during signal sampling.

The flag signal OVFB indicates that the sensed image signal is a white color. Therefore, when light illumination is high enough to generate the overflow in the APS, the sun black effect can be prevented by outputting a white color when a black color is detected in the second latches 61.

FIG. 5 is a diagram illustrating waveforms for driving the column ADC circuit shown in FIG. 4 and a voltage level at internal nodes of the column ADC circuit in FIG. 4.

The operation of the column ADC circuit of FIG. 4 will now be described with reference to FIGS. 4 and 5.

As shown in FIG. 5, in a double sampling method according to an exemplary embodiment of the present invention, a reset sampling period is divided into a front half A and a rear half B.

Prior to reset sampling in the double sampling method, the fourth control signal S4 and the fifth control signal S5 reach a high level, and a voltage of the first node 47 becomes equal to a voltage of the first input port 51 of the comparator 41. Further, the output of the inverter 43 is fed back into an input port of the inverter 43, and a voltage input into the input port of the inverter 43 becomes $V_{dd/2}$.

Next, the first control signal S1 reaches a high level in the front half A of the reset sampling period and electric charges corresponding to the reset voltage of the APS are stored in the first capacitor $C_0$. The second control signal S2 also reaches a high level in the front half A of the reset sampling period and electric charges output from the ramp generator are stored in the second capacitor $C_1$. The comparator 41 compares the reset voltage input into the first input port 51 with the reference voltage $V_{ref}$ and outputs the result of the comparison. In a normal operation, the output $V_{out}$ of the comparator 41 reaches a low level of 0V because the reset voltage $V_{in}$ is larger than the reference voltage $V_{ref}$. Therefore, the output signal of the inverter 43 reaches a high level $V_{dd}$ and the output signal with the high level $V_{dd}$ is latched on the first latch 59 of the digital converter 45.

When the APS is overflowed, for example, by photographing a subject under a high illumination, the reset voltage $V_{in}$ input into the first input port 51 of the comparator 41 is lower than the reference voltage $V_{ref}$. In this case, the voltage $V_{cnt}$ of the output port 53 of the comparator 41 reaches a high level, and a voltage $V_{cnt}$ of the output port 57 of the inverter 43 reaches a low level. When this occurs, the output voltage $V_{cnt}$ of the inverter 43 is latched on the first latch 59 of the digital converter 45.

Then, a conventional reset sampling is performed in the rear half B of the reset sampling period. In other words, the third control signal S3 and the fourth control signal S4 become logic-high thus enabling the comparator 41 and the inverter 43 to form a feedback structure. Therefore, the output port of the inverter 43 reaches a level of $V_{dd/2}$, and maintains the level of $V_{dd/2}$ when the first through fourth switches (SW1 to SW4) are turned off.

As further shown in FIG. 5, in the signal sampling period, the first control signal S1 and the second control signal S2 become logic-high again, thereby sampling a voltage corresponding to a photo charge output from the APS. A ramp voltage increasing with a predetermined slope is then output from the ramp generator. Next, the digital converter 45 counts the time required for the ramp voltage to reach a voltage corresponding to a voltage difference between the reset voltage and the signal voltage. Then, the second latches 61 latch the counted value and output the latched value. The counted value then becomes digital data corresponding to a sensed intensity of radiation.

When it is determined that the overflow is generated in the APS when a logic-low level is stored in the first latch 59, the digital converter 45 does not perform a normal digital conversion and the first latch 59 outputs the flag signal OVFB indicating the generation of the overflow. Here, the flag signal OVFB corresponds to a white color output from the digital converter 45 and an overflow sensing signal for sensing that an overflow generated in the APS is to be displayed as a white color.

Thus, according to an exemplary embodiment of the present invention, the sun black effect can be prevented because a white color is displayed when the overflow is generated in the APS. Therefore, the sun block effect can be prevented when an overflow is generated in the APS while photographing a person or object having a high illumination.

In another exemplary embodiment of the present invention, the column ADC circuit of FIG. 4 may include more than one inverter connected in series (not shown) and a switch group (not shown) wherein each switch of the group is connected in parallel with a respective one of the inverters. The switch group is turned on for a predetermined time before the reset sampling period and in the second portion of the reset sampling period and maintains a clamp voltage of the inverters.

In addition, the column ADC circuit may include one or more inverters (not shown) connected in series with the inverter 13 and a capacitor (not shown) connected between each of the inverters.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A column analog to digital converter (ADC) circuit of a CMOS image sensor (CIS), the column ADC circuit comprising:
   a comparator having a signal voltage input port and a reference voltage input port, comparing a reset voltage output from one of a plurality of CIS pixels with a reference voltage in a reset sampling period, and outputting an overflow sensing signal when the reset voltage is lower than the reference voltage; and
   a digital converter converting the output of the comparator into digital data,
   wherein the digital converter comprises a first latch storing the overflow sensing signal and outputting a flag signal indicating an overflow in response to the overflow sensing signal in a signal sampling period when the overflow sensing signal is output from the comparator during a first portion of the reset sampling period.

2. The column ADC circuit according to claim 1, wherein the flag signal indicates that a light signal detected from one of the CIS pixels is a white color.

3. The column ADC circuit according to claim 1, further comprising:
   a first capacitor connected between a first node and the signal voltage input port of the comparator to store a photo charge output from one of the CIS pixels;
   a second capacitor connected between a second node and the first node to store a ramp charge output from a ramp generator;
   a first switch connected between the first node and a photo charge input port receiving the photo charge signal output from the CIS pixel and turned on in the reset sampling period and the signal sampling period; and
   a second switch connected between the second node and a ramp charge input port receiving the ramp charge signal output from the ramp generator and turned on in the reset sampling period and the signal sampling period.

4. The column ADC circuit according to claim 1, wherein the digital converter comprises a plurality of second latches to count a clock to correspond to the photo charge in the signal sampling period and convert the counted clock into the digital data.

5. The column ADC circuit according to claim 4, wherein the flag signal indicates that a light signal detected from one of the CIS pixels is a white color when a black color is detected in one of the plurality of second latches.

6. The column ADC circuit according to claim 3, further comprising:
   a third switch connected in parallel with the first capacitor; and
   a fourth switch connected in parallel with the comparator, wherein the third switch is turned on for a predetermined time before the reset sampling period and connects the first node to the signal voltage input port of the comparator, and the fourth switch is turned on in a second portion of the reset sampling period to equalize a voltage level of the signal voltage input port of the comparator to a level of the reference voltage.

7. The column ADC circuit according to claim 6, further comprising:
   an inverter inversely amplifying the output of the comparator; and
   a fifth switch connected in parallel with the inverter, wherein the fifth switch is turned on for the predetermined time before the reset sampling period and in the second portion of the reset sampling period and maintains a clamp voltage of the inverter.

8. The column ADC circuit according to claim 7, further comprising:
   a capacitor connected between the comparator and the inverter.

9. The column ADC circuit according to claim 1, wherein the digital converter outputs digital data corresponding to a photo charge output from one of the CIS pixels when the comparator does not output the overflow sensing signal and outputs the flag signal indicating a white color when the comparator outputs the overflow sensing signal.

10. The column ADC circuit according to claim 1, wherein the plurality of CIS pixels are included in an active pixel sensor (APS) of the CIS.

11. A double sampling method for converting an analog signal output from a pixel of a CMOS image sensor (CIS) into a digital signal, the method comprising:
    performing a reset sampling by comparing a reset voltage output from the CIS pixel with a reference voltage and generating and storing an overflow sensing signal when the reset voltage is lower than the reference voltage;
    performing a signal sampling by sampling a signal corresponding to a photo charge output from the CIS pixel; and
    performing a digital conversion by outputting a flag signal indicating a white color when the overflow sensing signal is stored and outputting digital data corresponding to the photo charge when the overflow sensing signal is not stored.

12. The double sampling method according to claim 11, wherein the digital conversion comprises counting the time for a voltage corresponding to the photo charge to reach a predetermined voltage and converting the counted value into the digital data when the overflow sensing signal is not stored.

13. The double sampling method according to claim 11, further comprising:
    resetting an electric charge of a capacitor storing the photo charge before performing the reset sampling.

14. The double sampling method according to claim 11, wherein the overflow sensing signal is output during a first portion of the reset sampling.

15. The double sampling method according to claim 11, wherein the reset sampling comprises:
    comparing the reset voltage with the reference voltage and storing the overflow sensing signal; and
    setting a level of the reset voltage to be equal to the reference voltage.

16. The double sampling method according to claim 15, wherein the level of the reset voltage is set during a second portion of the reset sampling.

* * * * *